(12) United States Patent
Lai

(10) Patent No.: US 10,254,511 B2
(45) Date of Patent: Apr. 9, 2019

(54) OPTICAL LENS

(71) Applicant: Young Optics Inc., Hsinchu Science Park (TW)

(72) Inventor: Sheng-Tang Lai, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 81 days.

(21) Appl. No.: 15/192,423

(22) Filed: Jun. 24, 2016

(65) Prior Publication Data

US 2017/0371133 A1    Dec. 28, 2017

(51) Int. Cl.
| G02B 3/02 | (2006.01) |
| G02B 13/00 | (2006.01) |
| G02B 9/62 | (2006.01) |
| G02B 27/00 | (2006.01) |

(52) U.S. Cl.
CPC ......... G02B 13/0045 (2013.01); G02B 9/62 (2013.01); G02B 13/006 (2013.01); G02B 27/0025 (2013.01)

(58) Field of Classification Search
CPC .................................................. G02B 13/0045
USPC ........................................................... 359/708
See application file for complete search history.

(56) References Cited

U.S. PATENT DOCUMENTS

| 7,023,628 | B1 | 4/2006 | Ning |
| 7,286,302 | B2 | 10/2007 | Ohzawa et al. |
| 7,298,561 | B1 | 11/2007 | Yamashita et al. |
| 7,933,078 | B2 | 4/2011 | Jung et al. |
| 9,116,330 | B2 | 8/2015 | Abe |

*Primary Examiner* — James Jones
(74) *Attorney, Agent, or Firm* — Muncy, Geissler, Olds & Lowe, P.C.

(57) ABSTRACT

An optical lens includes a first lens group, a second lens group and an aperture stop. The first lens group and the second lens group are arranged in order along a direction, and the aperture stop is disposed between the first lens group and the second lens group. The second lens group has positive refractive power and a lens with a diffractive optical surface, and the optical lens satisfies the condition: $2 < (\Phi d * V)/\Phi r < 5$, where $\Phi d$ denotes refractive power of the diffractive optical surface, $\Phi r$ denotes refractive power of the lens, and V denotes an Abbe number of the lens.

20 Claims, 20 Drawing Sheets

OPTICAL LENS

BACKGROUND OF THE INVENTION a. Field of the Invention

The invention relates generally to an optical lens, and more particularly to an optical lens having a diffractive optical element and 24-hours confocal image-capturing capability b. Description of the Related Art

Nowadays, as smart home surveillance cameras become more immersed in user's everyday lives, there is a growing need for these devices to become thinner and have high optical performance. To meet these requirements, an optical lens needs to have low fabrication costs, large aperture, wide viewing angles, light weight and 24-hours confocal image-capturing capability. Therefore, it is desirable to provide an optical lens that may achieve lighter weight, lower fabrication costs, good imaging quality and 24-hours confocal image-capturing capability.

BRIEF SUMMARY OF THE INVENTION

According to one aspect of the present disclosure, an optical lens includes a first lens group, a second lens group and an aperture stop. The first lens group and the second lens group are arranged in order along a direction, and the aperture stop is disposed between the first lens group and the second lens group. The second lens group has positive refractive power and a lens with a diffractive optical surface, and the optical lens satisfies the condition:

$$2<(\Phi d*V)/\Phi r<5,$$

where $\Phi d$ denotes refractive power of the diffractive optical surface, $\Phi r$ denotes refractive power of the lens, and V denotes an Abbe number of the lens.

According to the above embodiment, the optical lens may achieve lighter weight, lower fabrication costs, good imaging quality and 24-hours confocal image-capturing capability.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 2 and FIG. 3 are ray fan plots of the optical lens of FIG. 1 respectively for visible light and 850 nm infrared light. FIG. 4 depicts a diffractive MTF curve for 587 nm green light, and FIG. 5 depicts a diffractive MTF curve for 850 nm infrared light.

FIG. 7 and FIG. 8 are ray fan plots of the optical lens of FIG. 1 respectively for visible light and 850 nm infrared light. FIG. 9 depicts a diffractive MTF curve for 587 nm green light, and FIG. 10 depicts a diffractive MTF curve for 850 nm infrared light.

FIG. 12 and FIG. 13 are ray fan plots of the optical lens of FIG. 11 respectively for visible light and 850 nm infrared light. FIG. 14 depicts a diffractive MTF curve for 587 nm green light, and FIG. 15 depicts a diffractive MTF curve for 850 nm infrared light.

FIG. 17 and FIG. 18 are ray fan plots of the optical lens of FIG. 16 respectively for visible light and 850 nm infrared light. FIG. 19 depicts a diffractive MTF curve for 587 nm green light, and FIG. 20 depicts a diffractive MTF curve for 850 nm infrared light.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
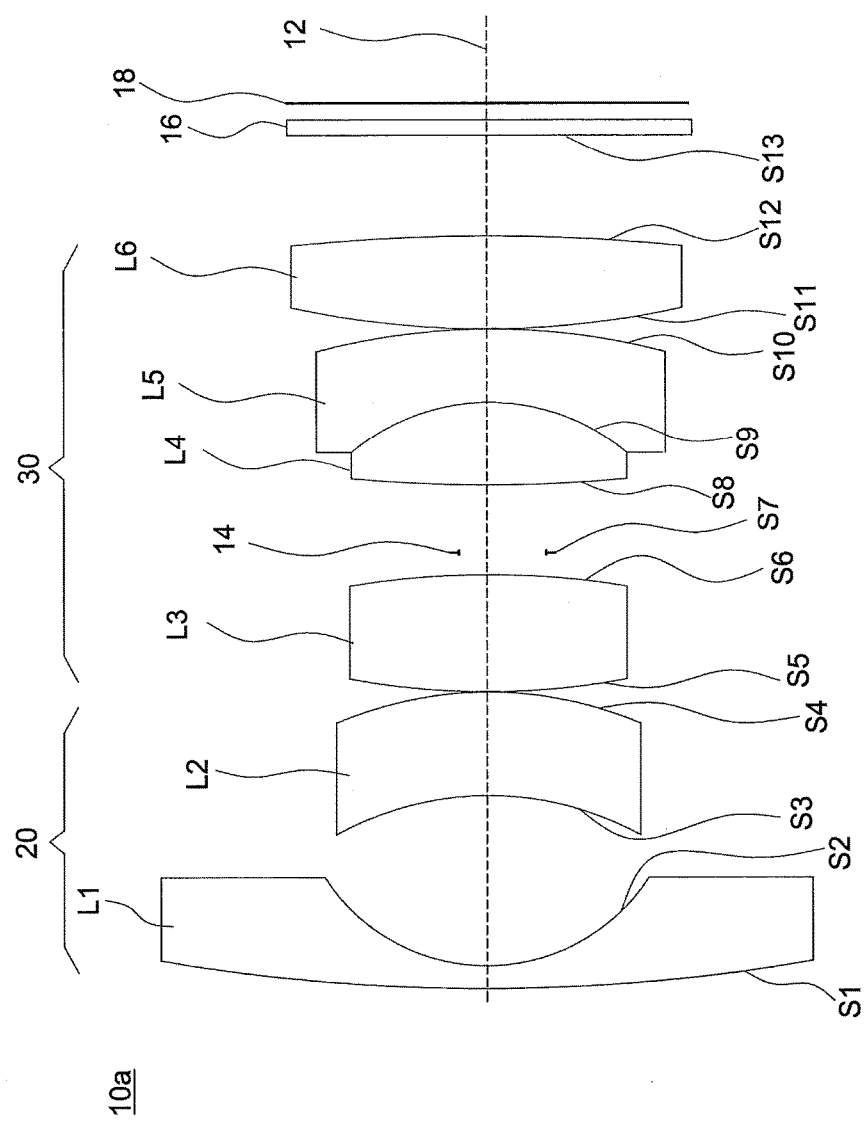
FIG. 1 shows a schematic diagram illustrating an optical lens according to an embodiment of the invention.

FIG. 1 shows a schematic diagram illustrating an optical lens according to an embodiment of the invention. An optical lens 10a is disposed between a magnified side (such as an object side on the left of FIG. 1) and a minified side (such as an image side on the right of FIG. 1). As shown in FIG. 1, the optical lens 10a may include a first lens group 20

(such as a front lens group) with negative refractive power disposed between the magnified side and the minified side, a second lens group 30 (such as a rear lens group) with positive refractive power disposed between the first lens group 20 and the minified side, and an aperture stop 14 disposed in the second lens group 30. Further, the minified side may be disposed with a cover glass 16 and an image sensor having an image plane 18. The cover glass 16 is disposed between the second lens group 30 and the image plane 18. The first lens group 20 may include a first lens L1 and a second lens L2 arranged in order, along an optical axis 12, from the magnified side to the minified side. The second lens group 30 may include a third lens L3, a fourth lens L4, a fifth lens L5 and a sixth lens L6 arranged in order, along the optical axis 12, from the magnified side to the minified side. The refractive powers of the first lens L1 to the sixth lens L6 are negative, negative, positive, positive, negative and positive, respectively. In this embodiment, the sixth lens L6 is an aspheric lens with a diffractive optical surface, the first lens L1, the second lens L2 and the fifth lens L5 are meniscus lenses, and the third lens L3 and the fourth lens L4 are bi-convex lenses. Further, the fourth lens L4 and the fifth lens L5 are joined together to form a cemented lens having positive refractive power. Note that adjoining surfaces respectively on the fourth lens L4 and the fifth lens L5 in a cemented lens have an identical radius of curvature, and that the lenses in a cemented lens may be joined together by various ways. For example, the lenses may be cemented together by applying an optical adhesive on adjoining lens surfaces, or stacked with each other and then pressed by a mechanical piece to be fitted with each other. The detailed optical data of the optical lens 10a such as lens parameters, shape, aspheric coefficients and diffractive coefficients are shown in Tables 1-3 below. In the following design examples of the invention, each aspheric surface satisfies the following equation:

$$Z = \frac{cr^2}{1 + \sqrt{1 - (1+k)c^2 r^2}} + Ar^4 + Br^6 + Cr^8 + Dr^{10} + Er^{12} + Fr^{14} + \dots \quad (1)$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-D shown in Table 2 are 4th, 6th, 8th and 10th order aspheric coefficients.

In the following design examples of the invention, a diffractive optical surface polynomial may be expressed as the following:

$$\phi(r) = (2\pi/\lambda_0)\Sigma C_n r^{2n} \quad (2),$$

where $\phi(r)$ denotes a phase function of a diffractive optical element, r denotes a radial distance relative to the optical axis of the optical lens, and $\lambda_0$ denotes a reference wavelength. That is, a diffractive optical surface is a lens surface that possesses a diffractive phase function. Parameters C1-C4 shown in Table 3 are 2th, 4th, 6th and 8th order coefficients of the diffractive optical surface polynomial.

TABLE 1

| Surface | Radius (mm) | Thickness (mm) | Refractive index | Abbe number | Object description |
|---|---|---|---|---|---|
| S1 | 35.56 | 0.70 | 1.62 | 58.2 | L1 (meniscus) |
| S2 | 4.20 | 5.28 | | | |
| S3 | −5.60 | 3.18 | 1.83 | 37.2 | L2 (meniscus) |
| S4 | −7.83 | 0.10 | | | |
| S5 | 12.39 | 3.51 | 1.8 | 39.6 | L3 (biconvex) |
| S6 | −26.90 | 0.70 | | | |
| S7 | ∞ | 2.34 | | | aperture stop |
| S8 | 24.15 | 2.46 | 1.7 | 41.2 | L4 (biconvex) |
| S9 | −4.28 | 2.29 | 1.92 | 18.9 | L5 (meniscus) |
| S10 | −12.68 | 0.10 | | | |
| S11 | 18.39 | 2.80 | 1.53 | 55.4 | L6 (aspheric) |
| S12 | −48.30 | 3.79 | | | |
| S13 | ∞ | 0.800 | 1.52 | 64.2 | cover glass |
| | ∞ | 0.796 | | | |
| | ∞ | | | | image plane |

Effective focal length (EFL) of visible light = 3.976 mm
Effective focal length (EFL) of NIR 850 nm light = 3.984 mm
F-Number = 1.8
Maximum field of view (FOV) = 163.8 degrees
Maximum image height = 8.914 mm
Total track length TTL (distance between the surface S1 and the image plane) = 28.83 mm In the above Table 1, the field heading "thickness" represents a distance of two adjacent surfaces along the optical axis 12. For example, a thickness of the surface S1 is a distance between the surface S1 and the surface S2 along the optical axis 12, and a thickness of the surface S1 is a distance between the surface S2 and the surface S3 along the optical axis 12. Further, a thickness (0.8 mm) of the surface S13 plus a succeeding thickness (0.796 mm) equals a distance between the surface S13 and the image plane 18 along the optical axis 12.

TABLE 2

| | S11 |
|---|---|
| K | −1.63 |
| A | 2.445E−06 |
| B | −5.290E−08 |
| C | 0 |
| D | 0 |

TABLE 3

| | S11 |
|---|---|
| diffraction order | 1 |
| C1 | 1.175E−03 |
| C2 | 0 |
| C3 | 0 |
| C4 | 0 |

Figure 2:
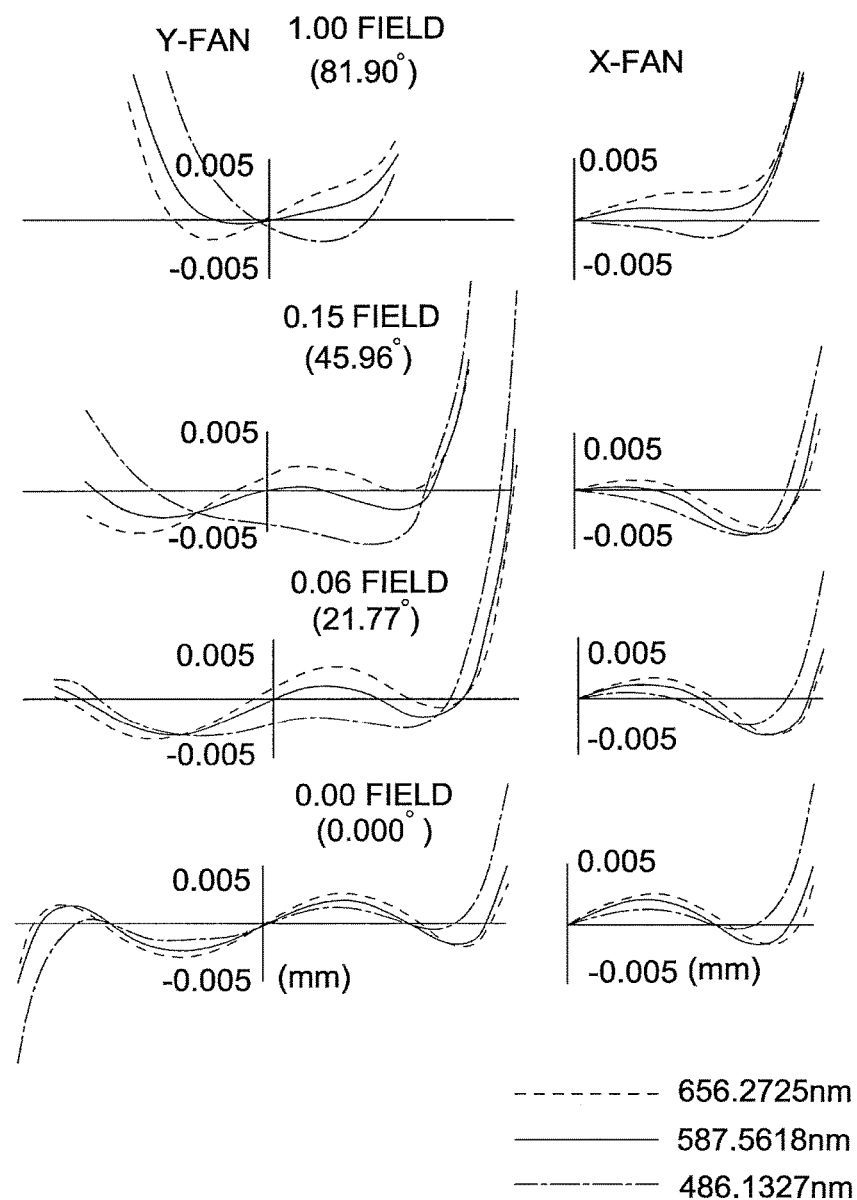
FIGS. 2, 3, 4 and 5 show optical simulation results of the optical lens shown in FIG. 1.
Figure 3:
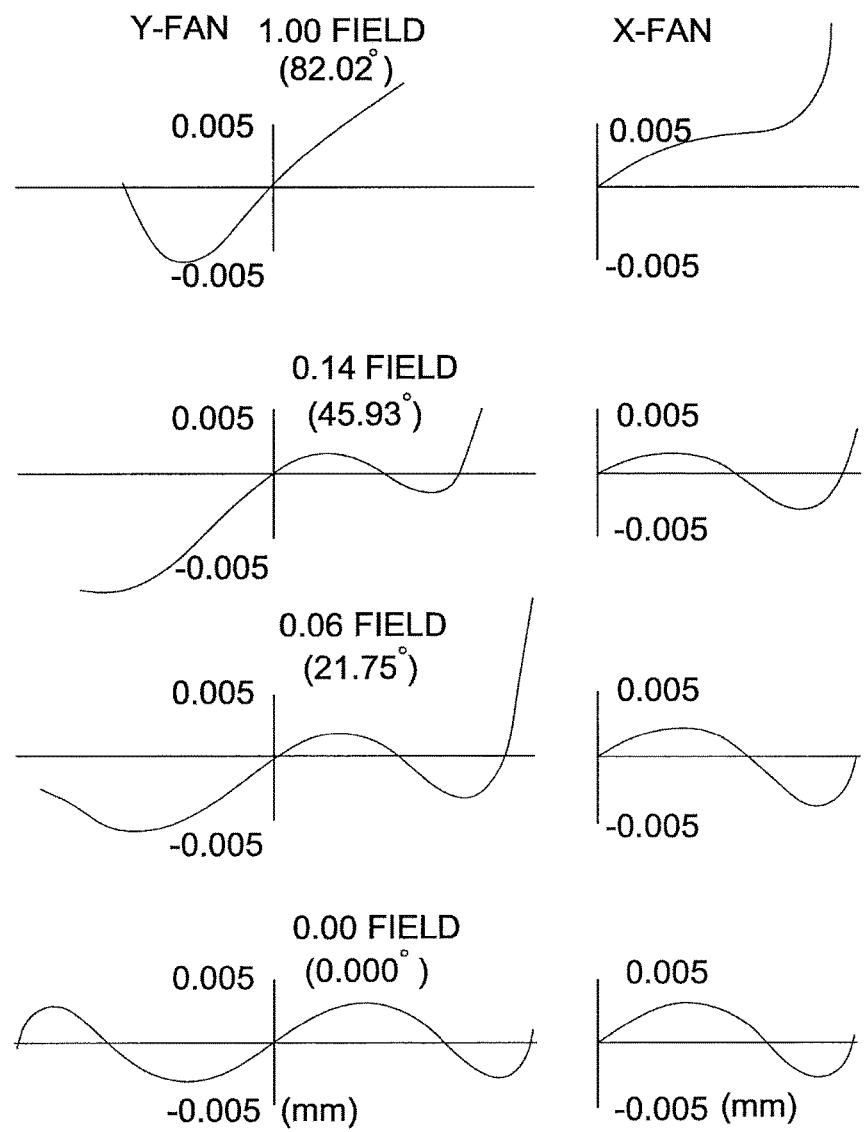
Figure 4:
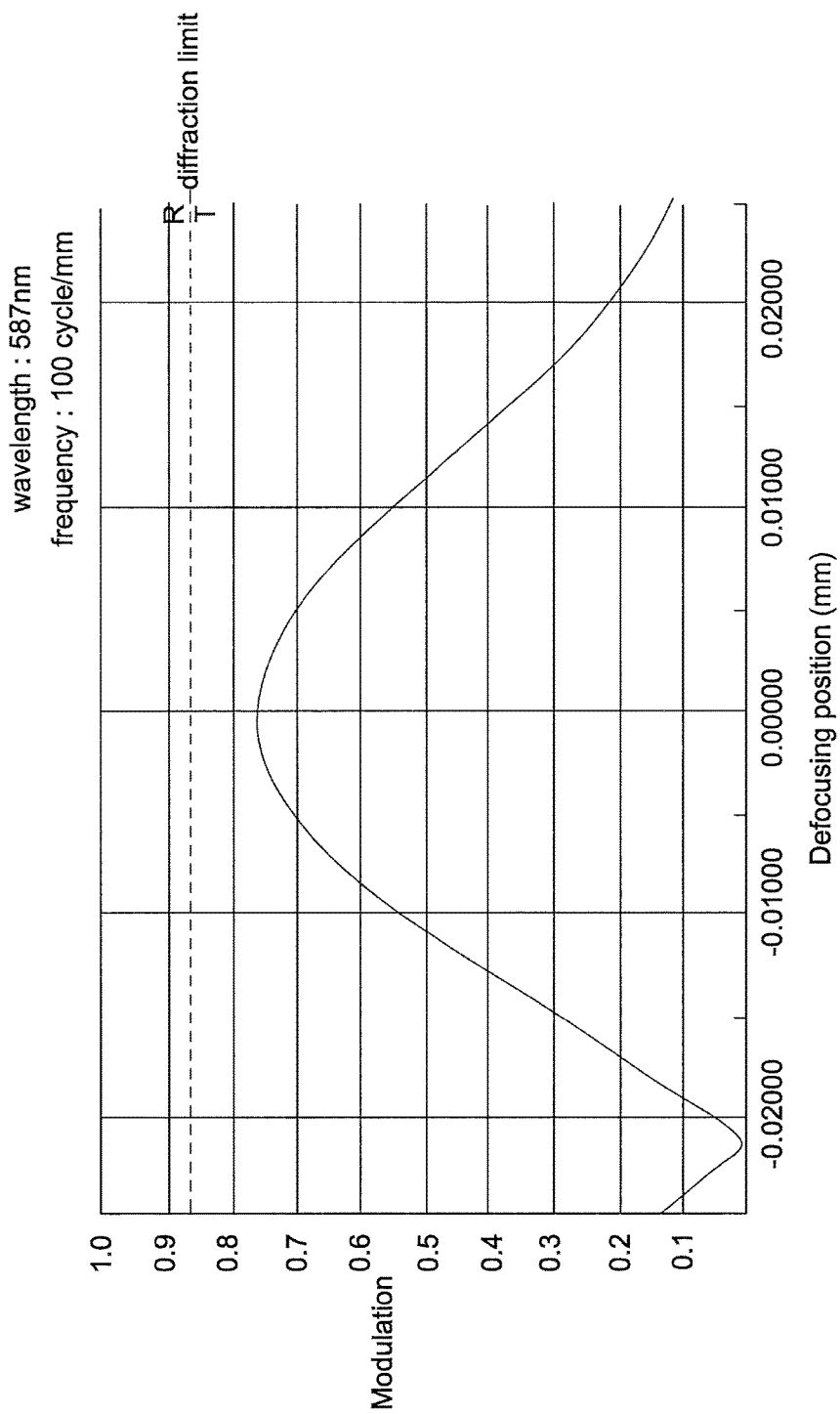
Figure 5:
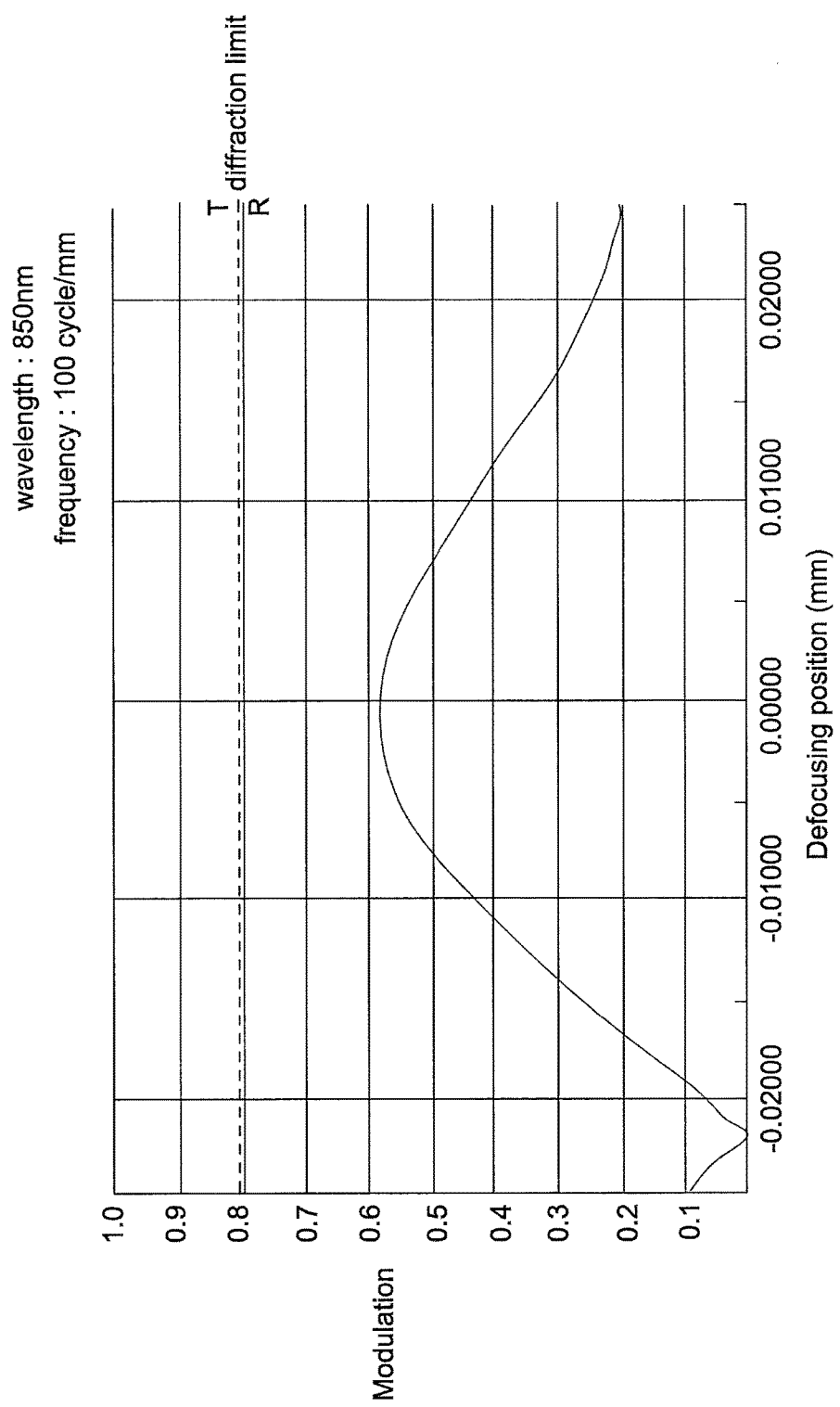

FIG. 2 and FIG. 3 are ray fan plots of the optical lens 10a respectively for visible light and 850 nm infrared light, where an abscissa of the plot represents entrance pupil positions, and an ordinate of the plot represents relative numerical values of positions on an image plane (such as the image plane 18) where main light beams are projected. FIGS. 4 and 5 show optical simulation results of the optical lens 10a. Specifically, FIG. 4 depicts a diffractive MTF curve for 587 nm green light, and FIG. 5 depicts a diffractive MTF curve for 850 nm infrared light. Comparing FIG. 4 with FIG. 5, it can be seen a focus shift is about 1 μm, where the focus shift is defined as a shift in a focal plane of 850 nm infrared light relative to a focal plane of 587 nm green light (standard focal plane) passing through the optical lens 10a. Note the diffractive MTF curve for green light may be depicted according to a wavelength of 555 nm other than 587 nm; that is, a focal plane of 555 nm green light may also serve as a standard focal plane. The simulated results shown in FIGS. 2-5 are within permitted ranges specified by the standard, which indicates the optical lens 10a according to the above embodiment may achieve good imaging quality and 24-hours confocal image-capturing capability.

In this embodiment, the optical lens 10a includes two lens groups and has an F number of 1.8. The optical lens 10a has an aspheric lens with a diffractive optical surface to correct monochromatic and chromatic aberrations. Further, the optical lens 10a may satisfy the following conditions:

$$2<(\Phi d*V)/\Phi r<5 \quad (3)$$

$$20<V<60 \quad (4),$$

where $\Phi d$ denotes refractive power of a diffractive optical surface and equals $C1/(-0.5)$ (Table 3 lists the value of C1), $\Phi r$ denotes refractive power of an aspheric lens, and V denote an Abbe number of the aspheric lens. Specifically, in case $(\Phi d*V)/\Phi r>5$, it may indicate that chromatic aberrations as a result of different wavelengths of visible light and infrared light are excessively corrected to cause a shortened infrared focal plane. In comparison, in case $(\Phi d*V)/\Phi r<2$, it may indicate that chromatic aberrations are not sufficiently corrected to cause a lengthened infrared focal plane. Therefore, the condition of $2<(\Phi d*V)/\Phi r<5$ allows the optical lens to achieve good imaging quality and 24-hours confocal image-capturing capability.

Figure 6:
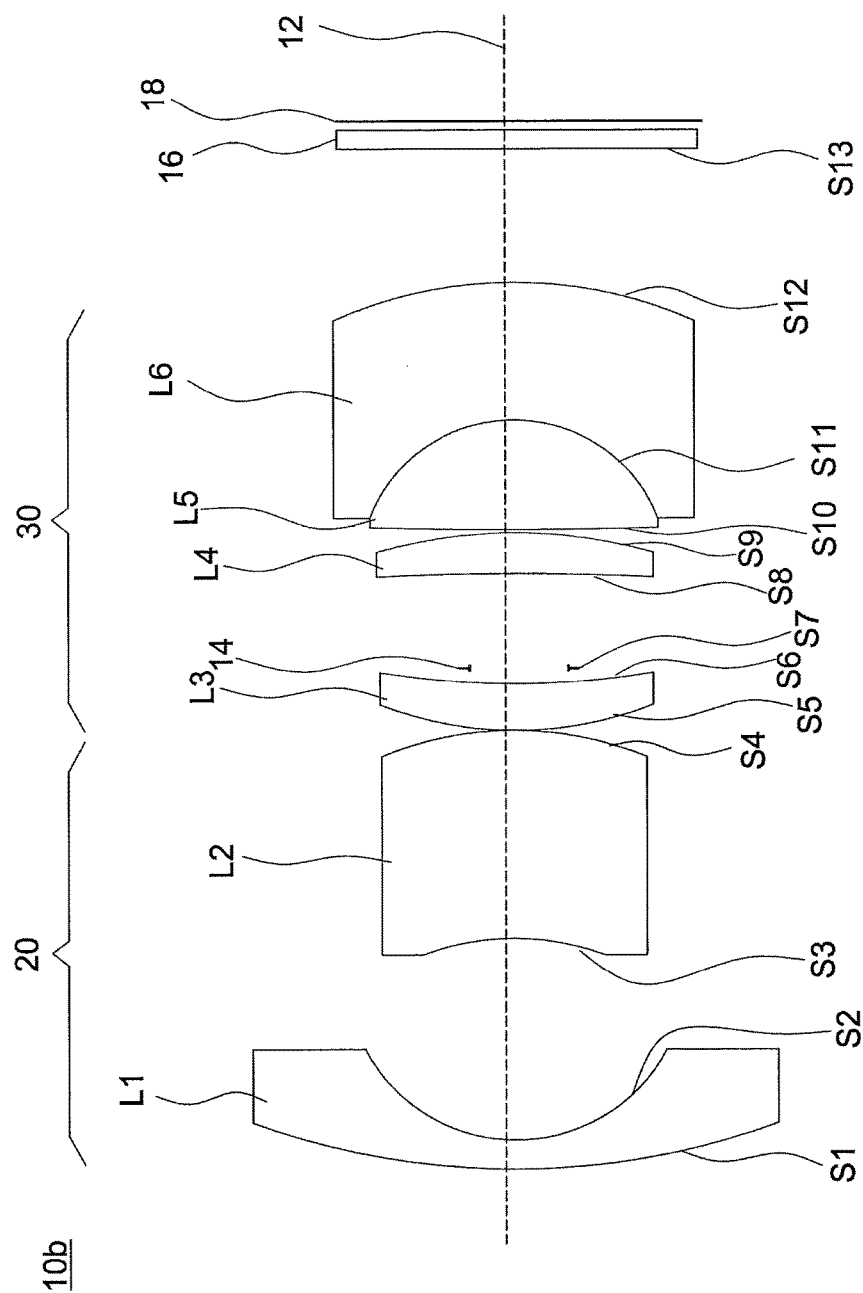
FIG. 6 shows a schematic diagram illustrating an optical lens according to another embodiment of the invention.

FIG. 6 shows a schematic diagram illustrating an optical lens according to another embodiment of the invention. An optical lens 10b is disposed between a magnified side (such as an object side on the left of FIG. 6) and a minified side (such as an image side on the right of FIG. 6). As shown in FIG. 6, the optical lens 10b may include a first lens group 20 (such as a front lens group) with negative refractive power disposed between the magnified side and the minified side, a second lens group 30 (such as a rear lens group) with positive refractive power disposed between the first lens group 20 and the minified side, and an aperture stop 14 disposed in the second lens group 30. Further, the minified side may be disposed with a cover glass 16 and an image sensor having an image plane 18. The cover glass 16 is disposed between the second lens group 30 and the image plane 18. The first lens group 20 may include a first lens L1 and a second lens L2 arranged in order, along an optical axis 12, from the magnified side to the minified side. The second lens group 30 may include a third lens L3, a fourth lens L4, a fifth lens L5 and a sixth lens L6 arranged in order, along the optical axis 12, from the magnified side to the minified side. The refractive powers of the first lens L1 to the sixth lens L6 are negative, negative, positive, positive, positive and negative, respectively. In this embodiment, the fourth lens L4 is an aspheric lens with a diffractive optical surface, the first lens L1, the second lens L2, the third lens L3 and the sixth lens L6 are meniscus lenses, and the fifth lens L5 is a bi-convex lens. Further, the fifth lens L5 and the sixth lens L6 are joined together to form a cemented lens having positive refractive power. Note that adjoining surfaces respectively on the fifth lens L5 and the sixth lens L6 in a cemented lens have an identical radius of curvature, and that the lenses in a cemented lens may be joined together by various ways. For example, the lenses may be cemented together by applying an optical adhesive on adjoining lens surfaces, or stacked with each other and then pressed by a mechanical piece to be fitted with each other. The detailed optical data of the optical lens 10b such as lens parameters, shape, aspheric coefficients and diffractive coefficients are shown in Tables 4-6 below, where parameters A-D shown in Table 5 are 4th, 6th, 8th and 10th order aspheric coefficients, and parameters C1-C4 shown in Table 6 are 2th, 4th, 6th and 8th order diffractive coefficients.

TABLE 4

| Surface | Radius (mm) | Thickness (mm) | Refractive index | Abbe number | Object description |
|---|---|---|---|---|---|
| S1 | 20.62 | 0.70 | 1.69 | 55.5 | L1 (meniscus) |
| S2 | 4.41 | 5.41 | | | |
| S3 | −7.53 | 5.66 | 1.83 | 37.2 | L2 (meniscus) |
| S4 | −11.19 | 0.10 | | | |
| S5 | 8.35 | 1.37 | 1.83 | 37.2 | L3 (meniscus) |
| S6 | 67.46 | 0.21 | | | |
| S7 | ∞ | 2.61 | | | aperture stop |
| S8 | 243.54 | 1.13 | 1.53 | 55.4 | L4 (aspheric) |
| S9 | −13.36 | 0.1 | | | |
| S10 | 57.70 | 2.93 | 1.69 | 55.5 | L5 (biconvex) |
| S11 | −4.02 | 3.78 | 1.92 | 20.8 | L6 (meniscus) |
| S12 | −11.77 | 4.19 | | | |
| S13 | ∞ | 0.80 | 1.52 | 64.2 | cover glass |
| | ∞ | 0.80 | | | image plane |

EFL of visible light = 4.04 mm
EFL of NIR 850 nm light = 4.054 mm
F-Number = 1.8
Maximum FOV = 138.5 degrees
Maximum image height = 8.914 mm
TTL = 30 mm In the above Table 4, the field heading "thickness" represents a distance of two adjacent surfaces along the optical axis 12. For example, a thickness of the surface S1 is a distance between the surface S1 and the surface S2 along the optical axis 12, and a thickness of the surface S1 is a distance between the surface S2 and the surface S3 along the optical axis 12. Further, a thickness (0.8 mm) of the surface S13 plus a succeeding thickness (0.8 mm) equals a distance between the surface S13 and the image plane 18 along the optical axis 12.

TABLE 5

| S8 | |
|---|---|
| K | 0 |
| A | −7.738E−04 |
| B | 2.689E−05 |
| C | −3.242E−06 |
| D | 2.228E−07 |

TABLE 6

| S8 | |
|---|---|
| diffraction order | 1 |
| C1 | −9.891E−04 |
| C2 | 0 |
| C3 | 0 |
| C4 | 0 |

Figure 7:
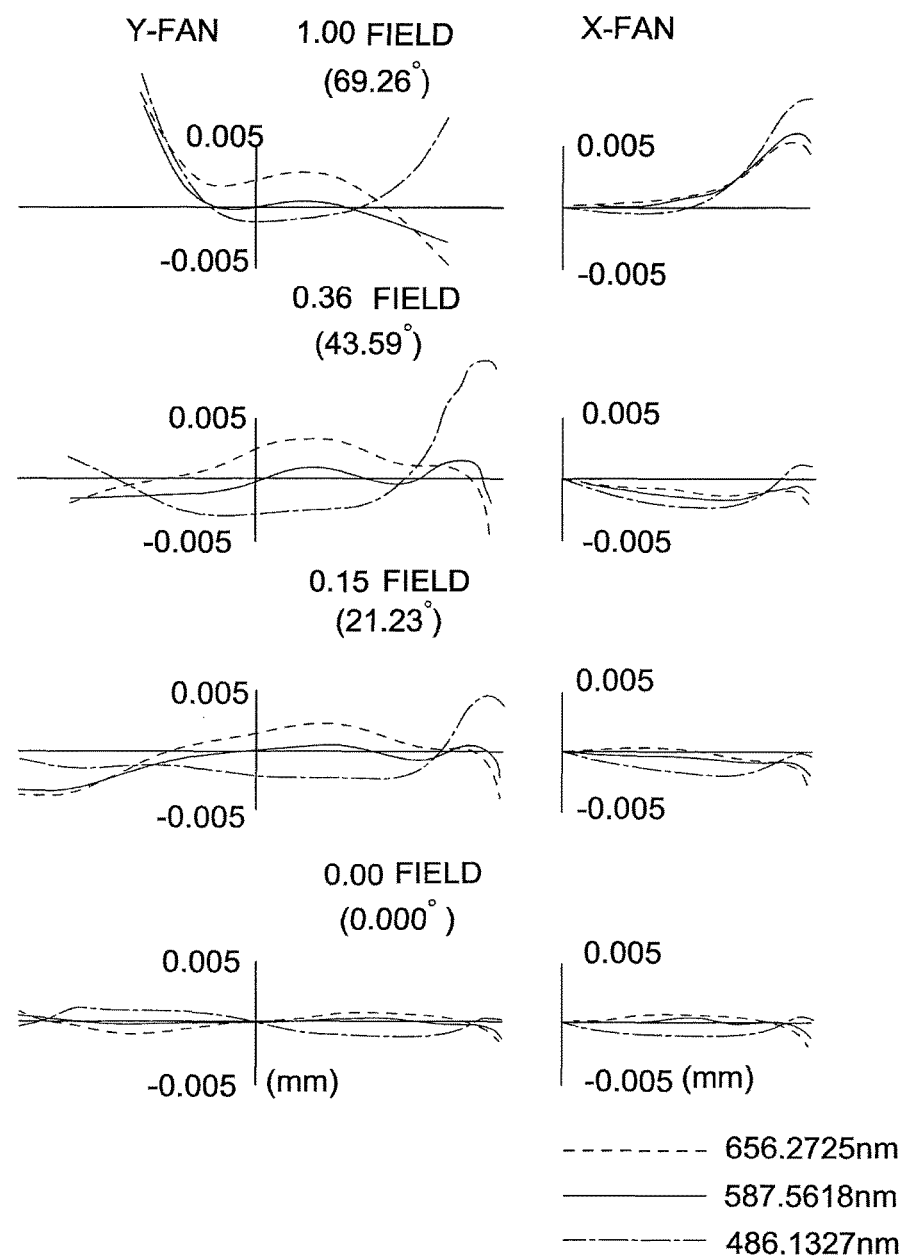
FIGS. 7, 8, 9 and 10 show optical simulation results of the optical lens shown in FIG. 6.
Figure 8:
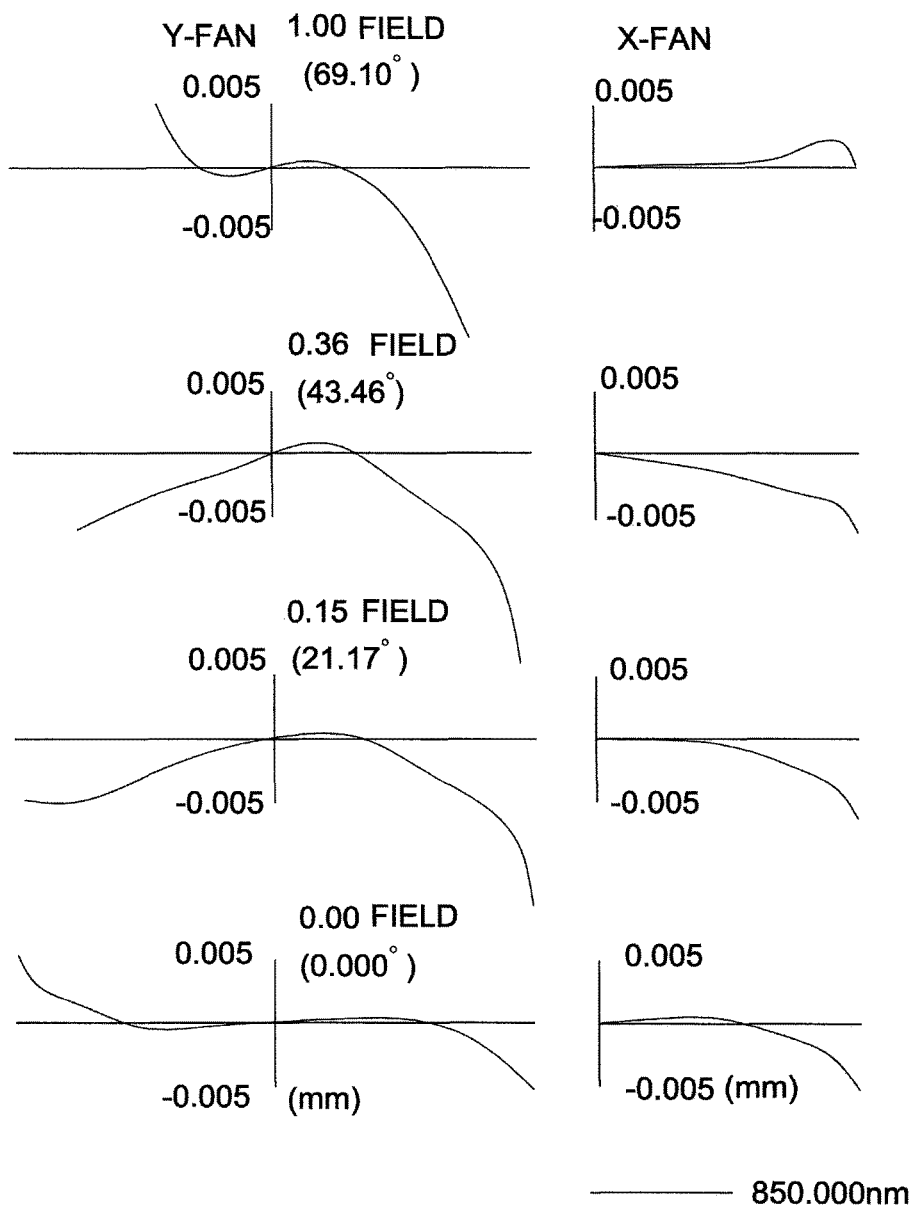

FIG. 7 and FIG. 8 are ray fan plots of the optical lens 10b respectively for visible light and 850 nm infrared light, where an abscissa of the plot represents entrance pupil positions, and an ordinate of the plot represents relative numerical values of positions on an image plane (such as the image plane 18) where main light beams are projected.

Figure 9:
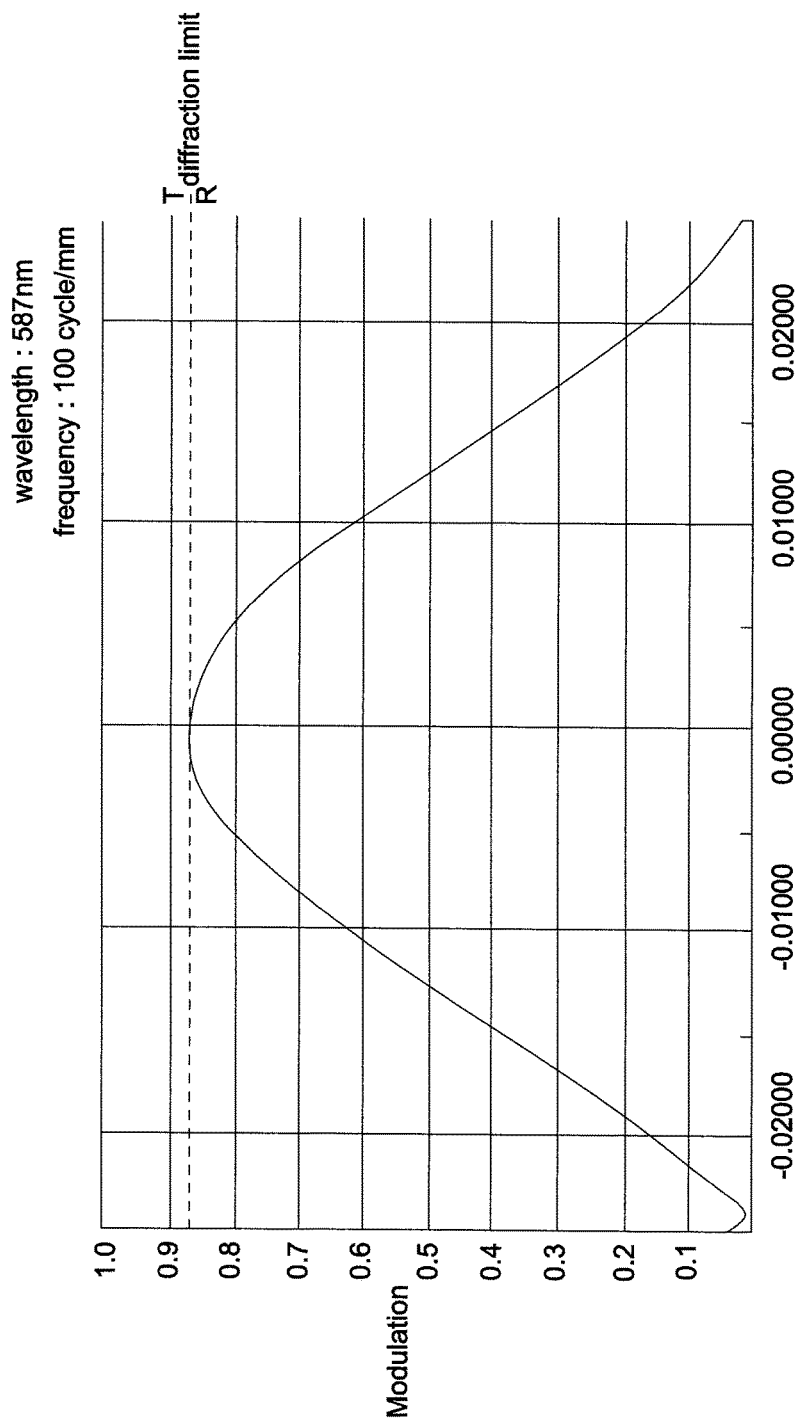
Figure 10:
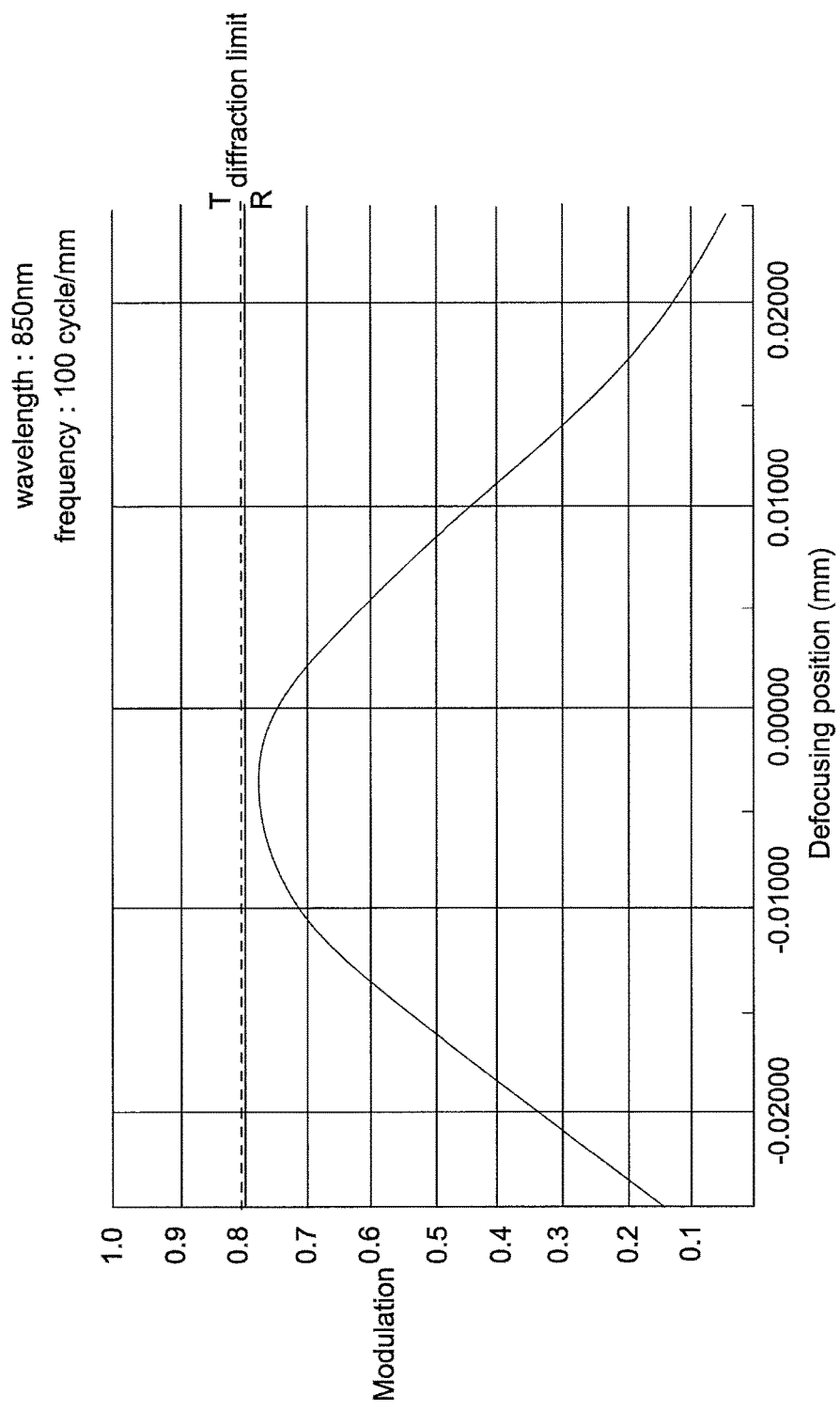

FIGS. 9 and 10 show optical simulation results of the optical lens 10b. Specifically, FIG. 9 depicts a diffractive MTF curve for 587 nm green light, and FIG. 10 depicts a diffractive MTF curve for 850 nm infrared light. Comparing FIG. 9 with FIG. 10, it can be seen a focus shift is about 4 µm. Note the diffractive MTF curve for green light may be depicted according to a wavelength of 555 nm other than 587 nm. The simulated results shown in FIGS. 7-10 are within permitted ranges specified by the standard, which indicates the optical lens 10b according to the above embodiment may achieve good imaging quality and 24-hours confocal image-capturing capability.

Figure 11:
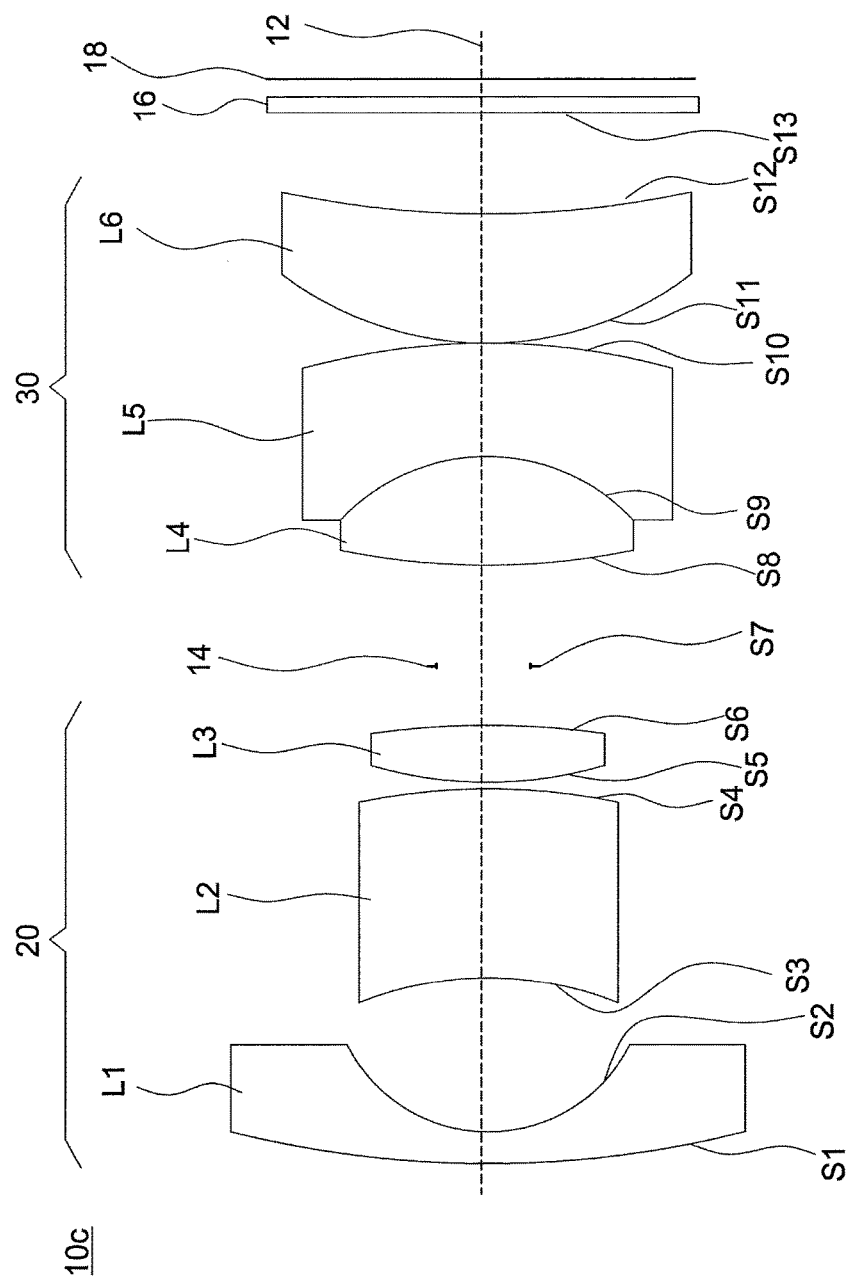
FIG. 11 shows a schematic diagram illustrating an optical lens according to another embodiment of the invention.

In this embodiment, the optical lens 10b includes two lens groups and has an F number of 1.8. The optical lens 10b has an aspheric lens with a diffractive optical surface to correct monochromatic and chromatic aberrations. Further, the optical lens 10b may satisfy the following conditions:

$$2<(\Phi d*V)/\Phi r<5 \quad (3)$$

$$20<V<60 \quad (4),$$

where $\Phi d$ denotes refractive power of a diffractive optical surface and equals C1/(−0.5) (Table 6 lists the value of C1), $\Phi r$ denotes refractive power of an aspheric lens, and V denote an Abbe number of the aspheric lens. Specifically, in case $(\Phi d*V)/\Phi r>5$, it may indicate that chromatic aberrations as a result of different wavelengths of visible light and infrared light are excessively corrected to cause a shortened infrared focal plane. In comparison, in case $(\Phi d*V)/\Phi r<2$, it may indicate that chromatic aberrations are not sufficiently corrected to cause a lengthened infrared focal plane. Therefore, the condition of $2<(\Phi d*V)/\Phi r<5$ allows the optical lens to achieve good imaging quality and 24-hours confocal image-capturing capability FIG. 11 shows a schematic diagram illustrating an optical lens according to another embodiment of the invention. An optical lens 10c is disposed between a magnified side (such as an object side on the left of FIG. 11) and a minified side (such as an image side on the right of FIG. 11). As shown in FIG. 11, the optical lens 10c may include a first lens group 20 disposed between the magnified side and the minified side, a second lens group 30 with positive refractive power disposed between the first lens group 20 and the minified side, and an aperture stop 14 disposed between the first lens group 20 and the second lens group 30. Further, the minified side may be disposed with a cover glass 16 and an image sensor having an image plane 18. The cover glass 16 is disposed between the second lens group 30 and the image plane 18. The first lens group 20 may include a first lens L1, a second lens L2 and a third lens L3 arranged in order, along an optical axis 12, from the magnified side to the minified side. The second lens group 30 may include a fourth lens L4, a fifth lens L5 and a sixth lens L6 arranged in order, along the optical axis 12, from the magnified side to the minified side. The refractive powers of the first lens L1 to the sixth lens L6 are negative, negative, positive, positive, negative and positive, respectively. In this embodiment, the sixth lens L6 is an aspheric lens with a diffractive optical surface, the first lens L1, the second lens L2 and the fifth lens L5 are meniscus lenses, and the third lens L3 and the fourth lens L4 are bi-convex lenses. Further, the fourth lens L4 and the fifth lens L5 are joined together to form a cemented lens having positive refractive power. Note that adjoining surfaces respectively on the fourth lens L4 and the fifth lens L5 in a cemented lens have an identical radius of curvature, and that the lenses in a cemented lens may be joined together by various ways. For example, the lenses may be cemented together by applying an optical adhesive on adjoining lens surfaces, or stacked with each other and then pressed by a mechanical piece to be fitted with each other. The detailed optical data of the optical lens 10c such as lens parameters, shape, aspheric coefficients and diffractive coefficients are shown in Tables 7-9 below, where parameters A-D shown in Table 8 are 4th, 6th, 8th and 10th order aspheric coefficients (shown in Equation 1), and parameters C1-C4 shown in Table 9 are 2th, 4th, 6th and 8th order diffractive coefficients (shown in Equation 2).

TABLE 7

| Surface | Radius (mm) | Thickness (mm) | Refractive index | Abbe number | Object description |
|---|---|---|---|---|---|
| S1 | 30.86 | 0.70 | 1.71 | 52.8 | L1 (meniscus) |
| S2 | 4.08 | 4.24 | | | |
| S3 | −8.43 | 4.95 | 1.71 | 52.8 | L2 (meniscus) |
| S4 | −12.04 | 0.12 | | | |
| S5 | 11.83 | 1.45 | 1.80 | 40.3 | L3 (biconvex) |
| S6 | −32.25 | 0.10 | | | |
| S7 | ∞ | 4.32 | | | aperture stop |
| S8 | 20.71 | 2.85 | 1.70 | 55.6 | L4 (biconvex) |
| S9 | −5.13 | 2.97 | 1.92 | 20.8 | L5 (meniscus) |
| S10 | −17.76 | 0.10 | | | |
| S11 | 7.87 | 3.30 | 1.53 | 55.6 | L6 (aspheric) |
| S12 | 19.80 | 2.92 | | | |
| S13 | ∞ | 0.80 | 1.52 | 64.2 | cover glass |
| | ∞ | 0.80 | | | |
| | ∞ | | | | image plane |

EFL of visible light = 3.964 mm
EFL of NIR 850 nm light = 3.959 mm
F-Number = 1.8
Maximum FOV = 154.8 degrees
Maximum image height = 8.914 mm
TTL = 29.6 mm In the above Table 7, the field heading "thickness" represents a distance of two adjacent surfaces along the optical axis 12. For example, a thickness of the surface S1 is a distance between the surface S1 and the surface S2 along the optical axis 12, and a thickness of the surface S1 is a distance between the surface S2 and the surface S3 along the optical axis 12. Further, a thickness (0.8 mm) of the surface S13 plus a succeeding thickness (0.8 mm) equals a distance between the surface S13 and the image plane 18 along the optical axis 12.

TABLE 8

| | S11 |
|---|---|
| K | −2.94 |
| A | 4.363E−04 |
| B | −3.304E−06 |
| C | 0 |
| D | 0 |

TABLE 9

| | S11 |
|---|---|
| diffraction order | 1 |
| C1 | −1.395E−03 |
| C2 | 0 |
| C3 | 0 |
| C4 | 0 |

Figure 12:
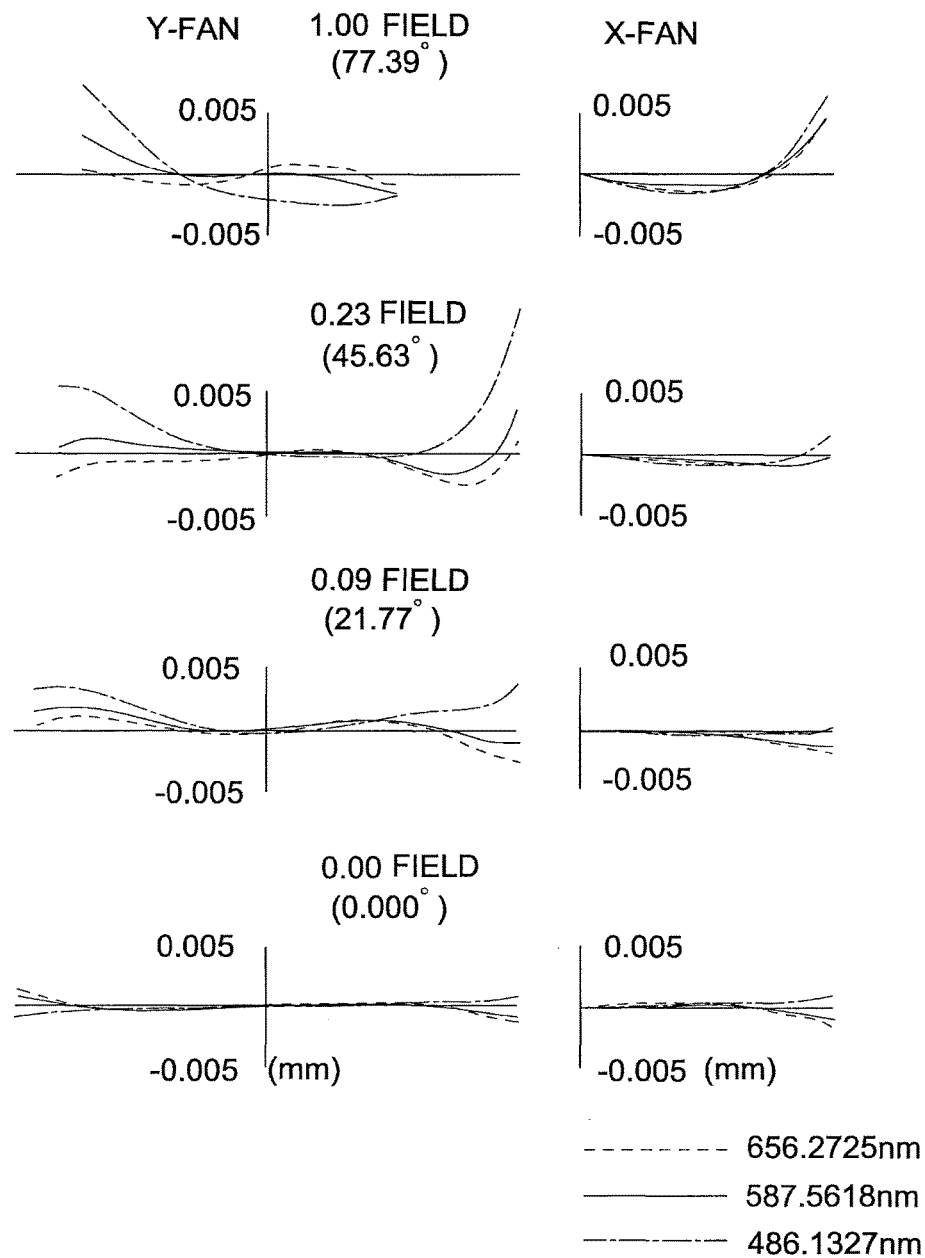
FIGS. 12, 13, 14 and 15 show optical simulation results of the optical lens shown in FIG. 11.
Figure 13:
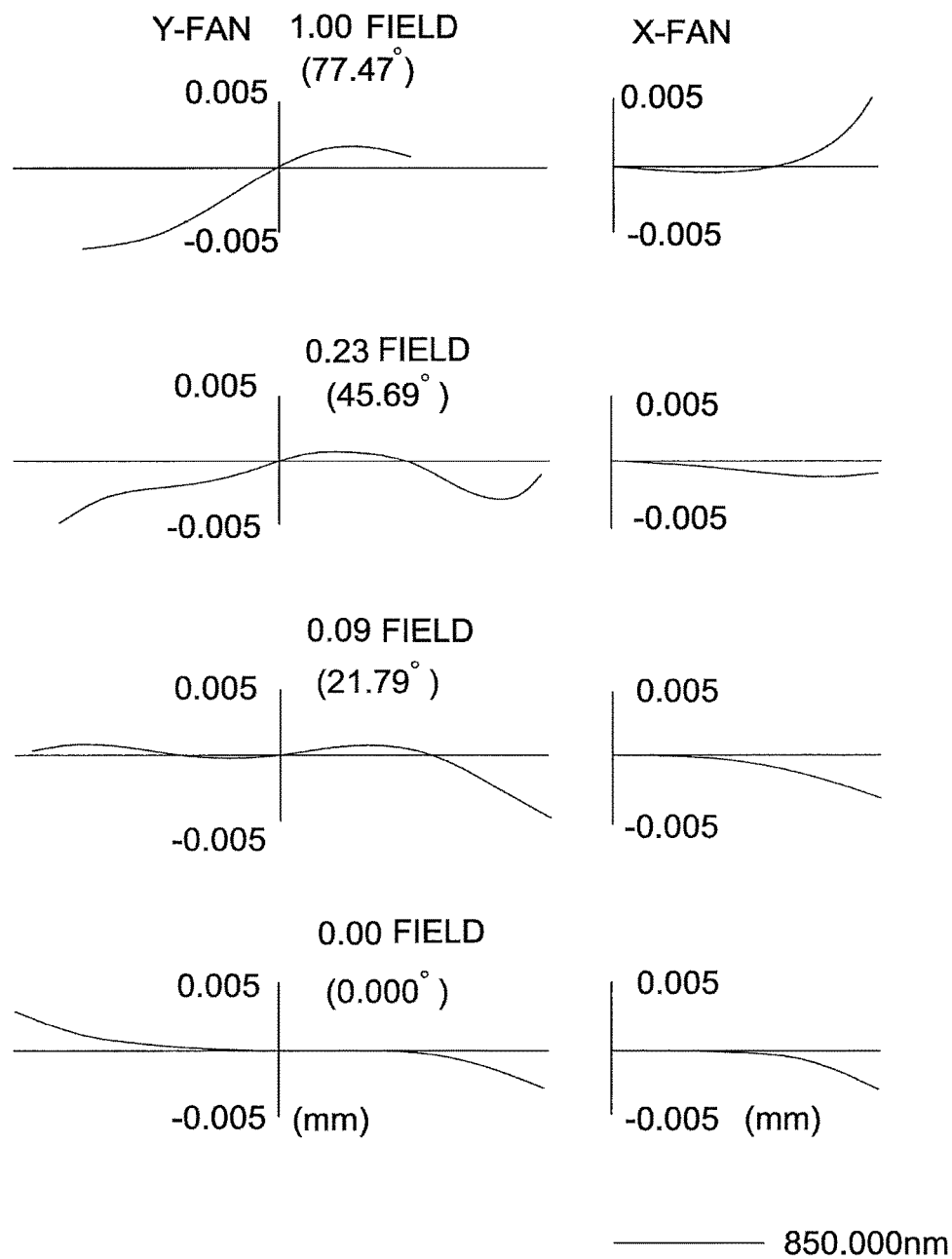
Figure 14:
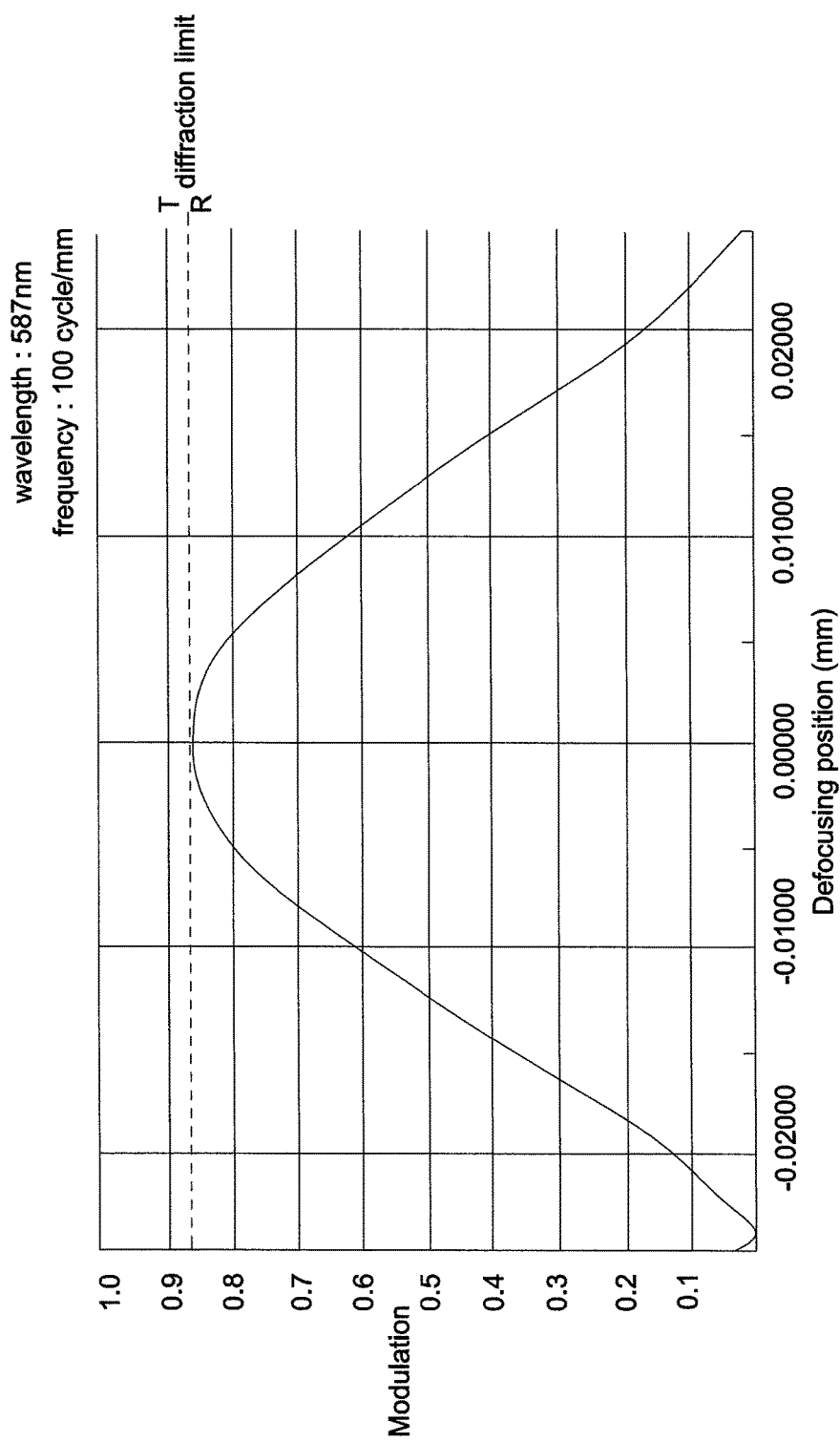
Figure 15:
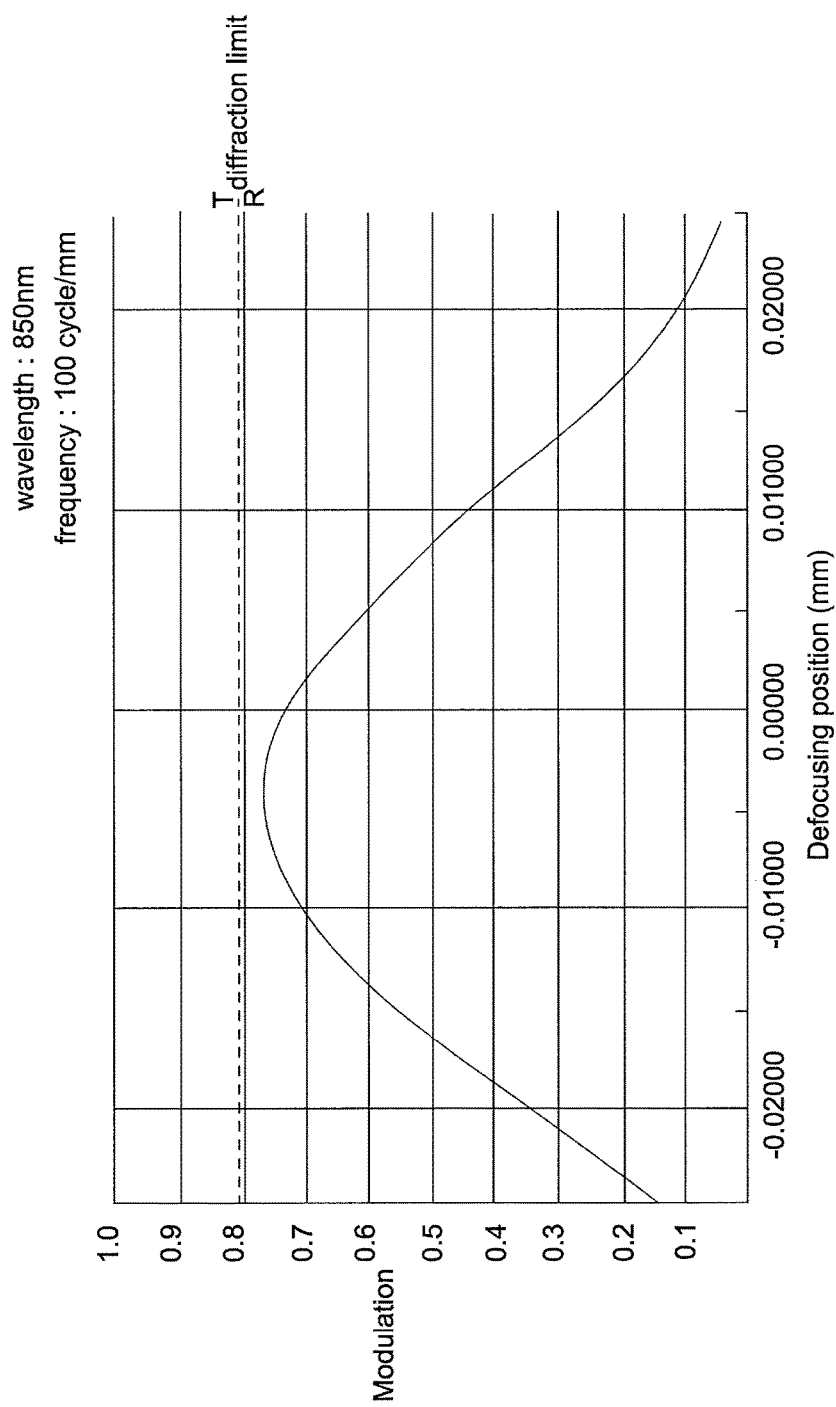

FIG. 12 and FIG. 13 are ray fan plots of the optical lens 10c respectively for visible light and 850 nm infrared light, where an abscissa of the plot represents entrance pupil positions, and an ordinate of the plot represents relative numerical values of positions on an image plane (such as the image plane 18) where main light beams are projected. FIGS. 14 and 15 show optical simulation results of the optical lens 10c. Specifically, FIG. 14 depicts a diffractive MTF curve for 587 nm green light, and FIG. 15 depicts a diffractive MTF curve for 850 nm infrared light. Comparing FIG. 14 with FIG. 15, it can be seen a focus shift is about 4 μm. Note the diffractive MTF curve for green light may be depicted according to a wavelength of 555 nm other than 587 nm. The simulated results shown in FIGS. 12-15 are within permitted ranges specified by the standard, which indicates the optical lens 10c according to the above embodiment may achieve good imaging quality and 24-hours confocal image-capturing capability.

Figure 16:
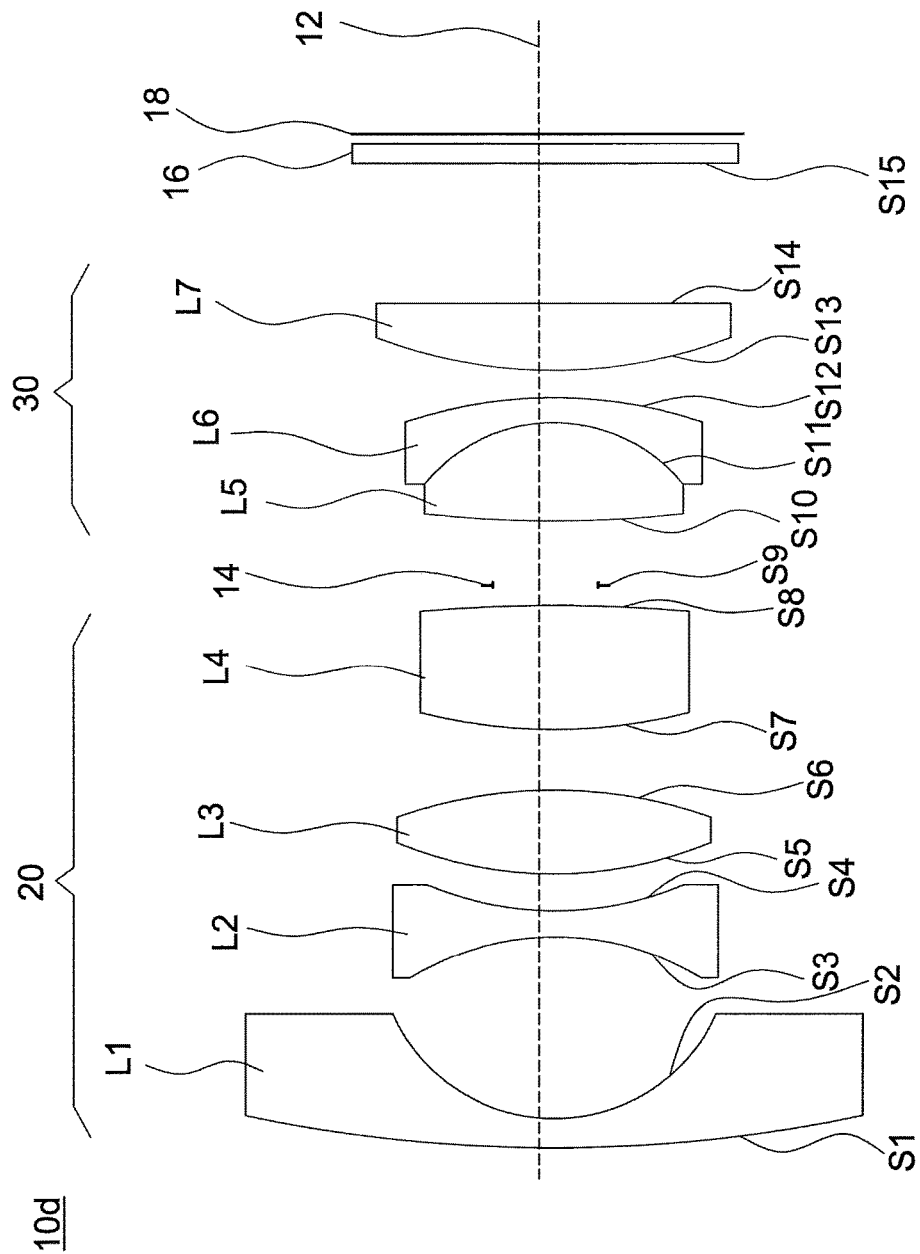
FIG. 16 shows a schematic diagram illustrating an optical lens according to another embodiment of the invention.

In this embodiment, the optical lens 10c includes two lens groups and has an F number of 1.8. The optical lens 10c has an aspheric lens with a diffractive optical surface to correct monochromatic and chromatic aberrations. Further, the optical lens 10c may satisfy the following conditions:

$$2 < (\Phi d \ast V)/\Phi r < 5 \qquad (3)$$

$$20 < V < 60 \qquad (4),$$

where $\Phi d$ denotes refractive power of a diffractive optical surface and equals C1/(−0.5) (Table 9 lists the value of C1), $\Phi r$ denotes refractive power of an aspheric lens, and V denote an Abbe number of the aspheric lens. Specifically, in case $(\Phi d \ast V)/\Phi r > 5$, it may indicate that chromatic aberrations as a result of different wavelengths of visible light and infrared light are excessively corrected to cause a shortened infrared focal plane. In comparison, in case $(\Phi d \ast V)/\Phi r < 2$, it may indicate that chromatic aberrations are not sufficiently corrected to cause a lengthened infrared focal plane. Therefore, the condition of $2 < (\Phi d \ast V)/\Phi r < 5$ allows the optical lens to achieve good imaging quality and 24-hours confocal image-capturing capability FIG. 16 shows a schematic diagram illustrating an optical lens according to another embodiment of the invention. An optical lens 10d is disposed between a magnified side (such as an object side on the left of FIG. 16) and a minified side (such as an image side on the right of FIG. 16). As shown in FIG. 16, the optical lens 10d may include a first lens group 20 disposed between the magnified side and the minified side, a second lens group 30 with positive refractive power disposed between the first lens group 20 and the minified side, and an aperture stop 14 disposed between the first lens group 20 and the second lens group 30. Further, the minified side may be disposed with a cover glass 16 and an image sensor having an image plane 18. The cover glass 16 is disposed between the second lens group 30 and the image plane 18. The first lens group 20 may include a first lens L1, a second lens L2, a third lens L3 and a fourth lens L4 arranged in order, along an optical axis 12, from the magnified side to the minified side. The second lens group 30 may include a fifth lens L5, a sixth lens L6 and a seventh lens L7 arranged in order, along the optical axis 12, from the magnified side to the minified side. The refractive powers of the first lens L1 to the seventh lens L7 are negative, negative, positive, positive, positive, negative and positive, respectively. In this embodiment, the fourth lens L4 is an aspheric lens with a diffractive optical surface, the first lens L1 and the sixth lens L6 are meniscus lenses, the second lens L2 is a bi-concave lens, and the third lens L3, the fifth lens L5 and the seventh lens L7 are bi-convex lenses. Further, the fifth lens L5 and the sixth lens L6 are joined together to form a cemented lens having positive refractive power. Note that adjoining surfaces respectively on the fifth lens L5 and the sixth lens L6 in a cemented lens have an identical radius of curvature, and that the lenses in a cemented lens may be joined together by various ways. For example, the lenses may be cemented together by applying an optical adhesive on adjoining lens surfaces, or stacked with each other and then pressed by a mechanical piece to be fitted with each other. The detailed optical data of the optical lens 10d such as lens parameters, shape, aspheric coefficients and diffractive coefficients are shown in Tables 10-12 below, where parameters A-D shown in Table 11 are 4th, 6th, 8th and 10th order aspheric coefficients (shown in Equation 1), and parameters C1-C4 shown in Table 12 are 2th, 4th, 6th and 8th order diffractive coefficients (shown in Equation 2).

TABLE 10

| Surface | Radius (mm) | Thickness (mm) | Refractive index | Abbe number | Object description |
|---|---|---|---|---|---|
| S1 | 39.80 | 0.70 | 1.62 | 58.2 | L1 (meniscus) |
| S2 | 4.70 | 4.90 | | | |
| S3 | −7.33 | 0.70 | 1.52 | 52.4 | L2 (biconcave) |
| S4 | 7.91 | 1.12 | | | |
| S5 | 11.91 | 2.11 | 1.83 | 37.2 | L3 (biconvex) |
| S6 | −12.56 | 1.68 | | | |
| S7 | 12.50 | 3.30 | 1.53 | 55.4 | L4 (aspheric) |
| S8 | −48.3 | 0.30 | | | |
| S9 | ∞ | 2.13 | | | aperture stop |
| S10 | 86.87 | 2.55 | 1.65 | 58.6 | L5 (biconvex) |
| S11 | −4.21 | 0.70 | 1.92 | 20.9 | L6 (meniscus) |
| S12 | −10.77 | 0.86 | | | |
| S13 | 13.37 | 1.66 | 1.83 | 37.2 | L7 (biconvex) |
| S14 | | 4.59 | | | |
| S15 | ∞ | 0.80 | 1.52 | 64.2 | cover glass |
| | ∞ | 0.80 | | | |
| | ∞ | | | | image plane |

EFL of visible light = 4.02 mm
EFL of NIR 850 nm light = 4.03 mm
F-Number = 1.8
Maximum FOV = 163.6 degrees
Maximum image height = 8.914 mm
TTL = 29.1 mm In the above Table 10, the field heading "thickness" represents a distance of two adjacent surfaces along the optical axis 12. For example, a thickness of the surface S1 is a distance between the surface S1 and the surface S2 along the optical axis 12, and a thickness of the surface S1 is a distance between the surface S2 and the surface S3 along the optical axis 12. Further, a thickness (0.8 mm) of the surface S13 plus a succeeding thickness (0.8 mm) equals a distance between the surface S13 and the image plane 18 along the optical axis 12.

TABLE 11

| | S7 |
|---|---|
| K | −1.7 |
| A | 4.429E−05 |
| B | −2.256E−07 |
| C | 0 |
| D | 0 |

TABLE 12

| | S7 |
|---|---|
| diffraction order | 1 |
| C1 | −1.535E−03 |

TABLE 12-continued

| | S7 |
|---|---|
| C2 | 0 |
| C3 | 0 |
| C4 | 0 |

Figure 17:
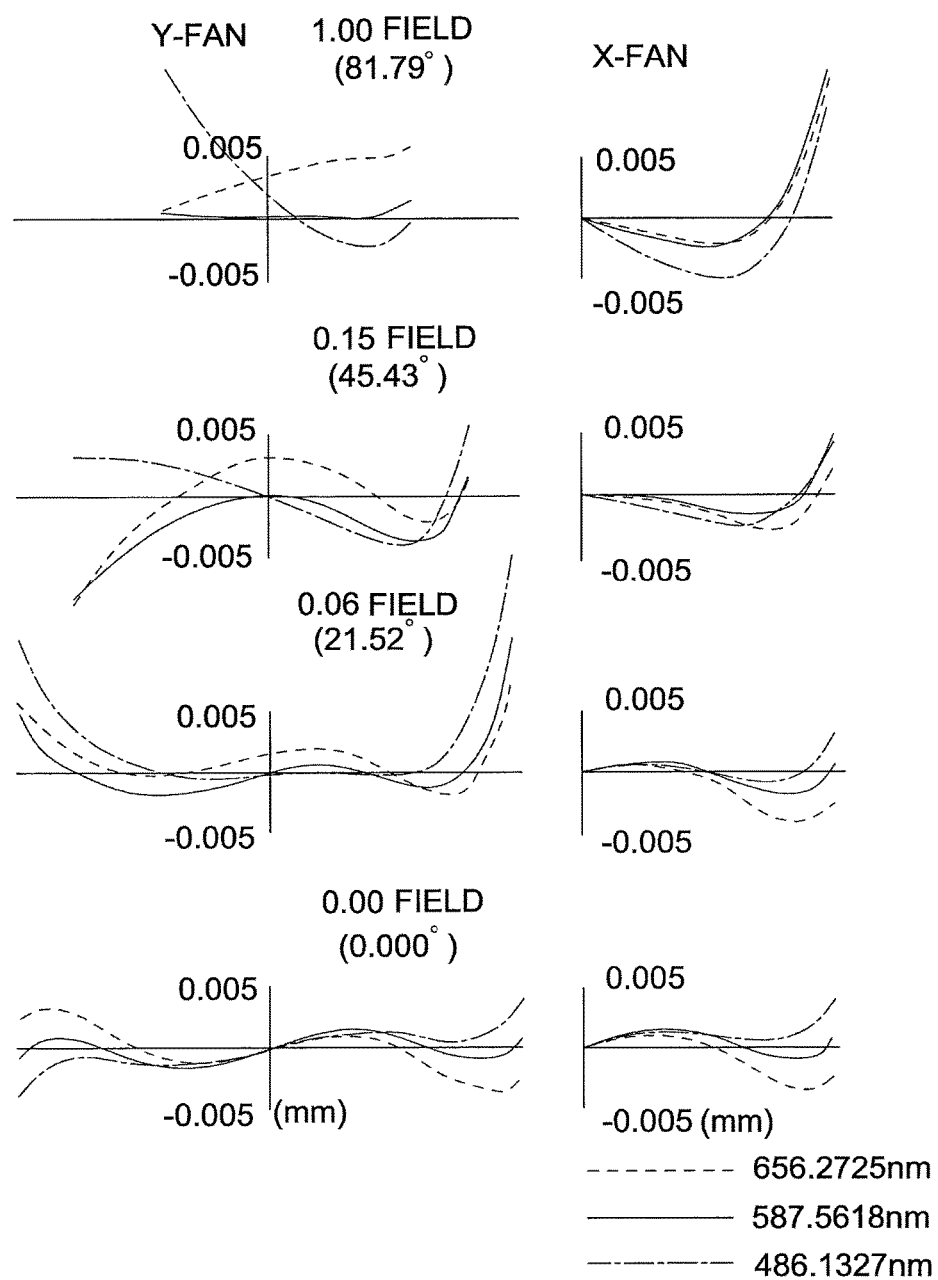
FIGS. 17, 18, 19 and 20 show optical simulation results of the optical lens shown in FIG. 16.
Figure 18:
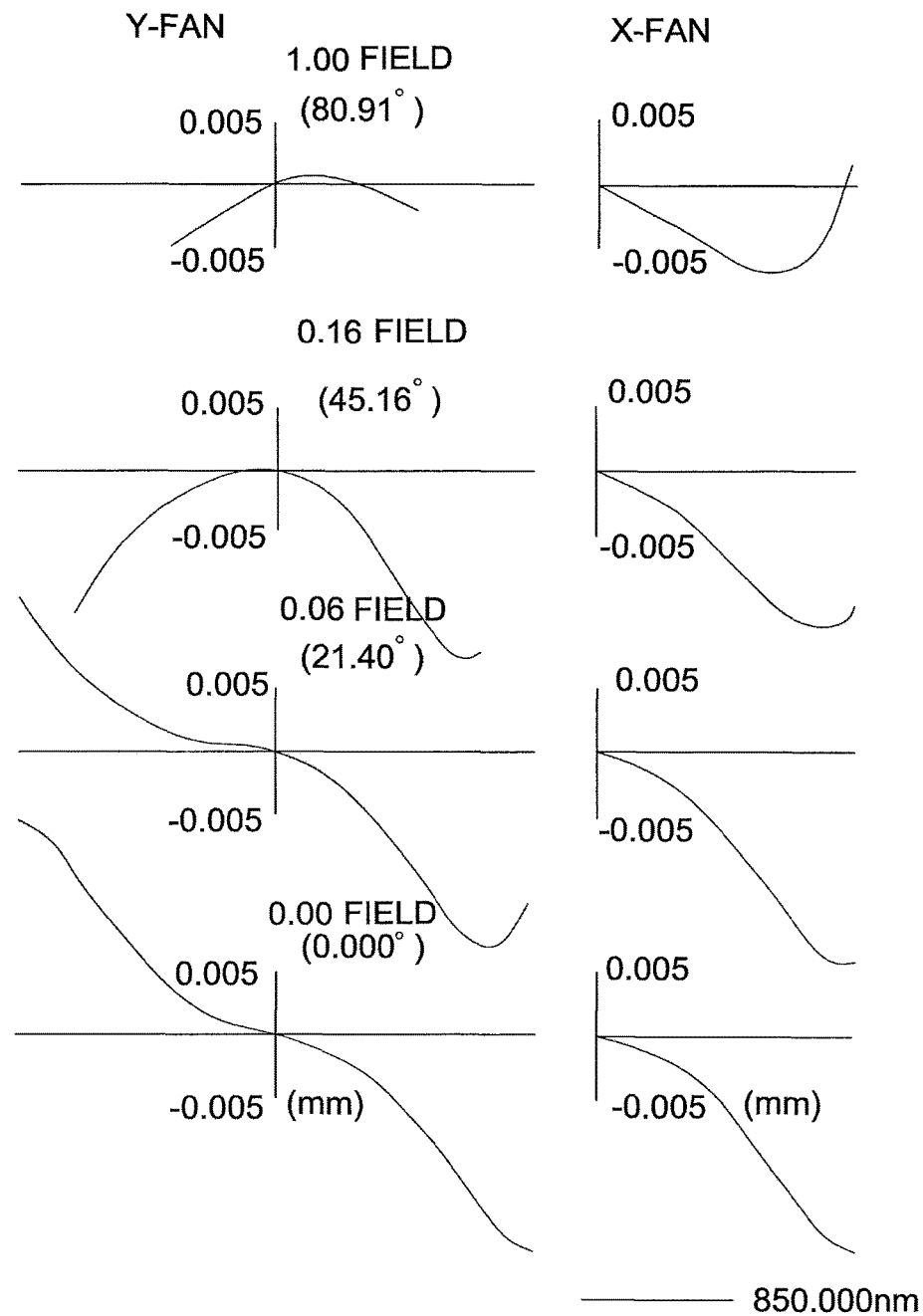
Figure 19:
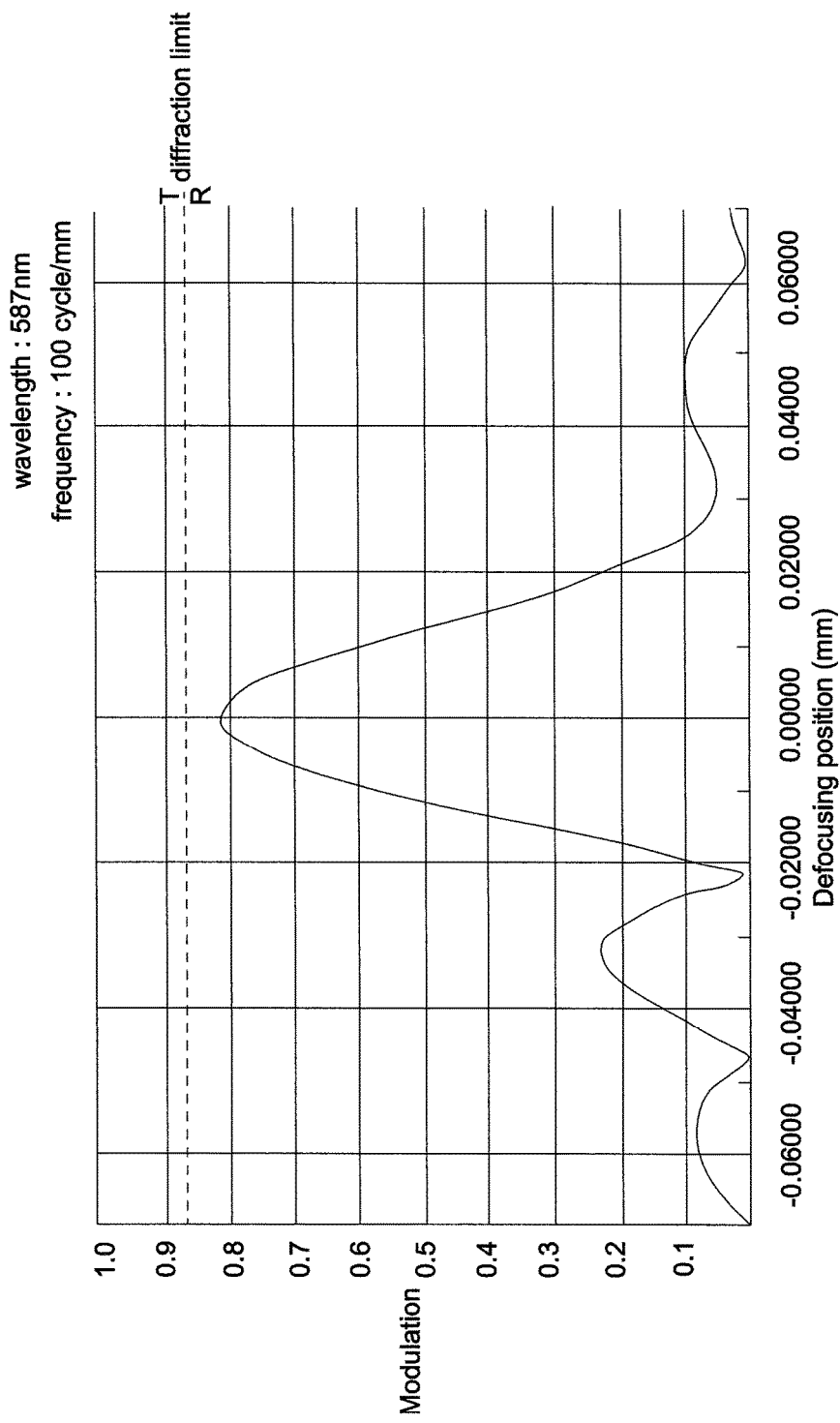
Figure 20:
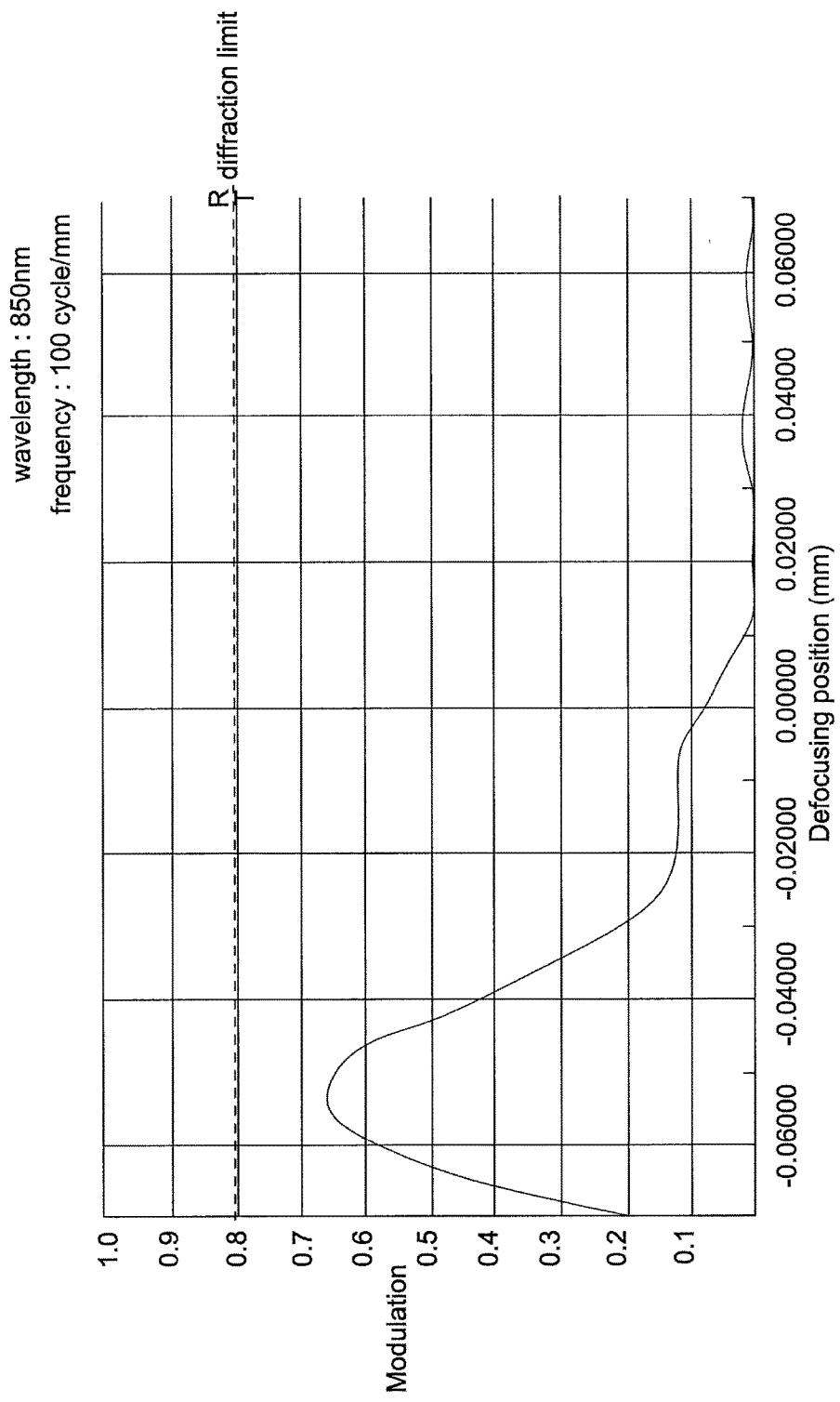

FIG. 17 and FIG. 18 are ray fan plots of the optical lens 10d respectively for visible light and 850 nm infrared light, where an abscissa of the plot represents entrance pupil positions, and an ordinate of the plot represents relative numerical values of positions on an image plane (such as the image plane 18) where main beams are projected. FIGS. 19 and 20 show optical simulation results of the optical lens 10d. Specifically, FIG. 19 depicts a diffractive MTF curve for 587 nm green light, and FIG. 20 depicts a diffractive MTF curve for 850 nm infrared light. Comparing FIG. 19 with FIG. 20, it can be seen a focus shift is about 53 μm. Note the diffractive MTF curve for green light may be depicted according to a wavelength of 555 nm other than 587 nm.

According to the above embodiments, the optical lens 10a, 10b and 10c may achieve lighter weight, lower fabrication costs, good imaging quality and 24-hours confocal image-capturing capability.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. An optical lens, comprising:
   a first lens group and a second lens group, the first lens group and the second lens group being arranged in order along a direction; and
   an aperture stop disposed between the first lens group and the second lens group, wherein the second lens group has positive refractive power and a lens with a diffractive optical surface, and the optical lens satisfies the condition:

$2<(\Phi d*V)/\Phi r<5$, where $\Phi d$ denotes refractive power of the diffractive optical surface, $\Phi r$ denotes refractive power of the lens, and V denotes an Abbe number of the lens.

2. The optical lens as claimed in claim 1, wherein the lens with the diffractive optical surface satisfies the condition:

$20<V<60$.

3. The optical lens as claimed in claim 1, wherein a number of lenses with refractive power in the first lens group is smaller than three.

4. The optical lens as claimed in claim 1, wherein a number of lenses with refractive power in the second lens group is smaller than five.

5. The optical lens as claimed in claim 1, wherein the first lens group has a first lens with negative refractive power and a second lens with negative refractive power.

6. The optical lens as claimed in claim 1, wherein the lens is an aspheric lens.

7. The optical lens as claimed in claim 1, wherein the lens has positive refractive power, and the second lens group further includes a cemented lens with positive refractive power and another lens with positive refractive power.

8. The optical lens as claimed in claim 7, wherein the lens is disposed further away from the first lens group than the another lens.

9. An optical lens, comprising:
   a first lens group with negative refractive power and a second lens group with positive refractive power, the first lens group and the second lens group being arranged in order along a direction and distinguished with each other by respective refractive powers, and the second lens group having a lens with a diffractive optical surface, wherein the optical lens satisfies the condition:

$2<(\Phi d*V)/\Phi r<5$, where $\Phi d$ denotes refractive power of the diffractive optical surface, $\Phi r$ denotes refractive power of the lens, and V denotes an Abbe number of the lens.

10. The optical lens as claimed in claim 9, wherein the lens with the diffractive optical surface satisfies the condition:

$20<V<60$.

11. The optical lens as claimed in claim 9, wherein a number of lenses with refractive power in the first lens group is smaller than three.

12. The optical lens as claimed in claim 9, wherein a number of lenses with refractive power in the second lens group is smaller than five.

13. The optical lens as claimed in claim 9, wherein the first lens group has a first lens with negative refractive power and a second lens with negative refractive power.

14. The optical lens as claimed in claim 9, wherein the lens is an aspheric lens.

15. The optical lens as claimed in claim 9, wherein the lens has positive refractive power, and the second lens group further includes a cemented lens with positive refractive power and another lens with positive refractive power.

16. An optical lens, comprising:
a first lens group;
a second lens group with positive refractive power, the first lens group and the second lens group being arranged in order along a direction; and
an aperture stop disposed between the first lens group and the second lens group, wherein a number of lenses with refractive power in the first lens group is smaller than three, a number of lenses with refractive power in the second lens group is smaller than five, the second lens group has a lens with a diffractive optical surface, and a focus shift of the optical lens is smaller than 5 μm, where the focus shift is defined as a shift in a focal plane of 850 nm infrared light relative to a standard focal plane, and the standard focal plane is a focal plane of 555 nm or 587 nm green light passing through the optical lens.

17. The optical lens as claimed in claim 16, wherein the lens with the diffractive optical surface satisfies the condition:

$$20 < V < 60,$$

where V denotes an Abbe number of the lens.

18. The optical lens as claimed in claim 16, wherein the first lens group has a first lens with negative refractive power and a second lens with negative refractive power.

19. The optical lens as claimed in claim 16, wherein the lens is an aspheric lens.

20. The optical lens as claimed in claim 16, wherein the lens has positive refractive power, and the second lens group further includes a cemented lens with positive refractive power and another lens with positive refractive power.

* * * * *